United States Patent
Watanabe

(10) Patent No.: US 11,553,716 B2
(45) Date of Patent: Jan. 17, 2023

(54) AGRICULTURAL AND HORTICULTURAL FUNGICIDE COMPOSITION

(71) Applicant: Nippon Soda Co., Ltd., Tokyo (JP)

(72) Inventor: Shinya Watanabe, Kanagawa (JP)

(73) Assignee: Nippon Soda Co., Ltd., Tokyo (JP)

( * ) Notice: Subject to any disclaimer, the term of this patent is extended or adjusted under 35 U.S.C. 154(b) by 184 days.

(21) Appl. No.: 16/963,563

(22) PCT Filed: Feb. 21, 2019

(86) PCT No.: PCT/JP2019/006458
§ 371 (c)(1),
(2) Date: Jul. 21, 2020

(87) PCT Pub. No.: WO2019/163868
PCT Pub. Date: Aug. 29, 2019

(65) Prior Publication Data
US 2020/0352168 A1 Nov. 12, 2020

(30) Foreign Application Priority Data
Feb. 23, 2018 (JP) .............................. JP2018-030704

(51) Int. Cl.
| | | |
|---|---|---|
| A01N 43/42 | (2006.01) | |
| A01N 37/44 | (2006.01) | |
| A01N 43/10 | (2006.01) | |
| A01N 43/72 | (2006.01) | |
| A01N 43/90 | (2006.01) | |
| A01N 47/14 | (2006.01) | |
| A01N 47/26 | (2006.01) | |
| A01N 47/44 | (2006.01) | |
| A01N 55/00 | (2006.01) | |

(52) U.S. Cl.
CPC ............. *A01N 43/42* (2013.01); *A01N 37/44* (2013.01); *A01N 43/10* (2013.01); *A01N 43/72* (2013.01); *A01N 43/90* (2013.01); *A01N 47/14* (2013.01); *A01N 47/26* (2013.01); *A01N 47/44* (2013.01); *A01N 55/00* (2013.01)

(58) Field of Classification Search
None
See application file for complete search history.

(56) References Cited

U.S. PATENT DOCUMENTS

| | | |
|---|---|---|
| 9,060,517 B2 | 6/2015 | Shibayama et al. |
| 2007/0232495 A1 | 10/2007 | Nappa et al. |
| 2011/0136782 A1 | 6/2011 | Mitani et al. |
| 2012/0289702 A1 | 11/2012 | Shibayama et al. |
| 2014/0221298 A1 | 8/2014 | Kuwahara |
| 2018/0271093 A1 | 9/2018 | Nishimura et al. |

FOREIGN PATENT DOCUMENTS

| | | |
|---|---|---|
| CN | 106035349 A | 10/2016 |
| JP | 2018-095644 A | 6/2018 |
| KR | 10-2013-0018662 A | 2/2013 |
| WO | WO-2010/018686 A1 | 2/2010 |
| WO | WO-2011/081174 A1 | 7/2011 |
| WO | WO-2011/108759 A2 | 9/2011 |
| WO | WO-2012/161071 A1 | 11/2012 |
| WO | WO-2013/047441 A1 | 4/2013 |
| WO | WO-2017/061483 A1 | 4/2017 |
| WO | WO2017/080870 A1 | 5/2017 |
| WO | WO-2018/050421 A1 | 3/2018 |

*Primary Examiner* — Bethany P Barham
*Assistant Examiner* — Barbara S Frazier
(74) *Attorney, Agent, or Firm* — Foley & Lardner LLP

(57) ABSTRACT

It is an object of the present invention to provide an agricultural and horticultural fungicide composition that exhibits an excellent control effect on plant diseases even in a small dose and causes no fear of phytotoxicity to useful plants. The agricultural and horticultural fungicide composition of the present invention comprises at least one compound A selected from the group consisting of a compound of formula (1) {wherein each X independently is a halogeno group or a C1-6 alkyl group; n is the number of X and is any integer of 0 to 5; X' is a halogeno group; $R^1$, $R^2$ and $R^3$ each independently are a C1-6 alkyl group, a C1-6 alkoxy group or a hydroxyl group; and $A^1$ and $A^2$ each independently are a nitrogen atom or a carbon atom}, and the like, and at least one compound B selected from the group consisting of silthiofam, an antibiotic, propineb and chinomethionat.

2 Claims, No Drawings

AGRICULTURAL AND HORTICULTURAL FUNGICIDE COMPOSITION

CROSS-REFERENCE TO RELATED APPLICATIONS

This application is the U.S. National Stage of PCT/JP2019/006458, filed Feb. 21, 2019, which claims priority to JP 2018-030704, filed Feb. 23, 2018.

TECHNICAL FIELD

The present invention relates to an agricultural and horticultural fungicide composition. More particularly, the present invention relates to an agricultural and horticultural fungicide composition that exhibits an excellent control effect on plant diseases even in a small dose and causes no fear of phytotoxicity to useful plants. The present application claims a right of priority to Japanese Patent Application No. 2018-030704 applied on Feb. 23, 2018, and the contents thereof are incorporated herein by reference.

BACKGROUND ART

In cultivation of agricultural and horticultural crops, a large number of drugs for crop disease control are used. However, it is hard to say that many of them are fully satisfactory controlling drugs on the grounds that the control effect is insufficient, appearance of drug-resistant pathogens restricts use of drugs, a plant body suffers phytotoxicity or contamination, toxicity to humans, animals and fishes is strong, etc.

Under such circumstances, various fungicide compositions containing a nitrogen-containing heterocyclic compound and/or its salt as an active ingredient have been proposed (see for example, patent documents 1 and 2).

PRIOR ART DOCUMENTS

Patent Documents

Patent Document 1: WO2010/018686
Patent Document 2: WO2011/081174

SUMMARY OF THE INVENTION

Object to be Solved by the Invention

It is an object of the present invention to provide an agricultural and horticultural fungicide composition that exhibits an excellent control effect on plant diseases even in a small dose and causes no fear of phytotoxicity to useful plants.

Means to Solve the Object

In order to solve the above object, the present inventor has earnestly studied. As a result, the present invention including the following aspects has been completed.

That is to say, the present invention is as follows.

[1] An agricultural and horticultural fungicide composition comprising at least one compound A selected from the group consisting of a compound of formula (1), a compound of formula (2), and salts thereof, and at least one compound B selected from the group consisting of silthiofam, an antibiotic, propineb and chinomethionat,

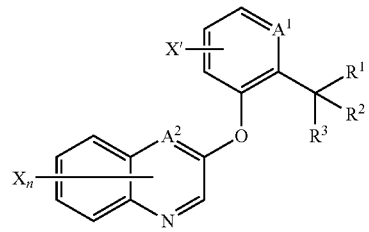

{wherein each X independently is a halogeno group or a C1-6 alkyl group; n is the number of X and is any integer of 0 to 5; X' is a halogeno group; $R^1$, $R^2$ and $R^3$ each independently are a C1-6 alkyl group, a C1-6 alkoxy group or a hydroxyl group; and $A^1$ and $A^2$ each independently are a nitrogen atom or a carbon atom},

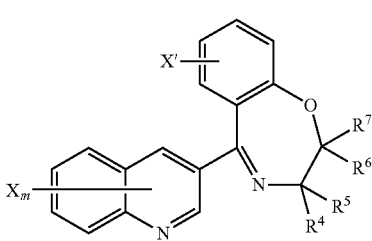

{wherein each X independently is a halogeno group or a C1-6 alkyl group; m is the number of X and is any integer of 0 to 6; X' is a halogeno group; and $R^4$, $R^5$, $R^6$ and $R^7$ each independently are a hydrogen atom, a C1-6 alkyl group or a hydroxyl group}.

[2] The agricultural and horticultural fungicide composition according to [1], wherein the compound A is a compound of formula (a-1):

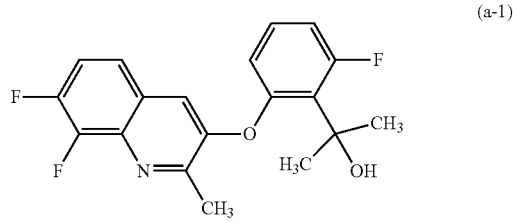 [SMILES: Cc1nc2c(F)c(F)ccc2cc1Oc1cccc(F)c1C(C)(C)O]

[3] The agricultural and horticultural fungicide composition according to [1] or [2], wherein the antibiotic is at least one compound selected from the group consisting of streptomycin, a sulfate thereof and oxytetracycline.

Effect of the Invention

The agricultural and horticultural fungicide composition of the present invention exhibits an excellent control effect on plant diseases even in an extremely small dose and causes no fear of phytotoxicity to useful plants. The agricultural and horticultural fungicide composition of the present invention exerts a prominent synergistic plant disease control effect that is unexpectable from the plant disease control effect obtained by the use of the compound A only or the use of the compound B only.

MODE OF CARRYING OUT THE INVENTION

The agricultural and horticultural fungicide composition of the present invention comprises a compound A and a compound B.

[Compound A]

The compound A for use in the present invention is at least one compound selected from the group consisting of a compound of formula (1) (sometimes written as a "compound (1)" hereinafter), a compound of formula (2) (sometimes written as a "compound (2)" hereinafter), a salt of the compound (1), and a salt of the compound (2).

Each X in the formula (1) and the formula (2) independently is a halogeno group or a C1-6 alkyl group. n represents the number of X and is any integer of 0 to 5. m is the number of X and is any integer of 0 to 6.

As the C1-6 alkyl group in X, a methyl group, an ethyl group, an n-propyl group, an i-propyl group, an n-butyl group, an s-butyl group, an i-butyl group, a t-butyl group, an n-pentyl group, an n-hexyl group or the like may be exemplified. In the C1-6 alkyl group, some or all of hydrogen atoms may be substituted by other groups, as long as the effect of the present invention is not hindered. As the substituent group, a halogeno group, a hydroxy group or the like may be exemplified.

As the halogeno group in X, a fluoro group, a chloro group, a bromo group, an iodo group or the like may be exemplified.

X' in each of the formula (1) and the formula (2) is a halogeno group. As the halogeno group in X', the same groups as exemplified in X may be exemplified.

$R^1$, $R^2$, and $R^3$ in the formula (1) each independently are a C1-6 alkyl group, a C1-6 alkoxy group or a hydroxy group.

As the C1-6 alkyl group in $R^1$, $R^2$ and $R^3$, the same groups as exemplified in X may be exemplified.

As the C1-6 alkoxy group in $R^1$, $R^2$ and $R^3$, a methoxy group, an ethoxy group, an n-propoxy group, an i-propoxy group, a n-butoxy group, a s-butoxy group, an i-butoxy group, a t-butoxy group or the like may be exemplified.

$R^4$, $R^5$, $R^6$ and $R^7$ in the formula (2) each independently are a hydrogen atom, a C1-6 alkyl group or a hydroxy group. As the C1-6 alkyl group in $R^4$, $R^5$, $R^6$ and $R^7$, the same groups as exemplified in X may be exemplified.

The salt of the compound (1) and the salt of the compound (2) for use in the present invention are not particularly limited, as long as they are agriculturally and horticulturally permitted. As each of the salts, a salt of an inorganic acid, such as a hydrochloride, a nitrate, a sulfate or a phosphate; a salt of an organic acid, such as an acetate, a lactate, a propionate or a benzoate; or the like may be exemplified.

The compound (1) and its salt are each a known compound. Specific examples of the compound (1) and its salt may include compounds described in WO2011/081174A1. The compound (1) and its salt may be produced by a known method, such as a method described in WO2011/081174A1.

The compound (2) and its salt are each a known compound. Specific examples of the compound (2) and its salt may include compounds described in WO2010/018686A1. The compound (2) and its salt may be produced by a known method, such as a method described in WO2010/018686A1.

Specific examples of the compound A in the present invention may include the following compounds. 2-{2-[(7,8-difluoro-2-methylquinolin-3-yl)oxy]-6-fluorophenyl}propan-2-ol: ipflufenoquin: CAS. 1314008-27-9 (Formula (a-1)), 2-[2-fluoro-6-(8-fluoro-quinolin-3-yloxy)-phenyl]-3,3-dimethyl-butan-2-ol, 2-[2-fluoro-6-(7,8-difluoro-2-methylquinolin-3-yloxy)phenyl]propan-2-ol, 9-fluoro-5-(3-quinolinyl)-2,2,3,3-tetramethyl-2,3-dihydro-benzo[f][1,4]oxazepine, 9-chloro-2,2-dimethyl-5-(quinolin-3-yl)-2,3-dihydro-benzo[f][1,4]oxazepine, and 9-chloro-2-ethyl-5-(8-fluoroquinolin-3-yl)-2-methyl-2,3-dihydro-benzo[f][1,4]oxazepine.

[Compound B]

The compound B for use in the present invention is any one of silthiofam, an antibiotic, propineb and chinomethionat (quinoxaline-based fungicide).

(Silthiofam)

Silthiofam is a compound of following (b-1).

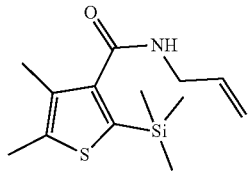

(Antibiotic)

As the antibiotic, streptomycin, streptomycin sulfate, oxytetracycline, kasugamycin, validamycin, oxolinic acid, polyoxin (complex) or the like may be exemplified.

(Propineb)

Propineb is a dithiocarbamate-based fungicide, and is a compound of following (b-2).

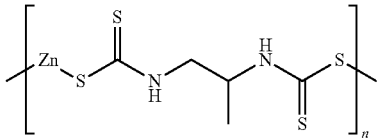

(Chinomethionat)

Chinomethionat is a compound of following (b-3).

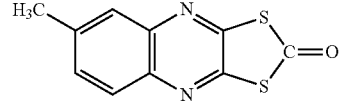

As another preferred compound B, metconazole, pyraclostrobin, mepanipyrim, pyrimethanil, dithianon, propiconazole, pyrapropoyne or the like may be exemplified.

A blending ratio of the agricultural and horticultural fungicide composition of the present invention only needs to be a blending ratio that exerts a synergistic effect, and a weight ratio between the compound A and the compound B (compound A:compound B) is usually 1:1,000,000 to 1,000,000:1, preferably 1:100,000 to 100,000:1, more preferably 1:10,000 to 10,000 to 1, still more preferably 1:1,000 to 1,000:1, even more preferably 100:1 to 1:100, and particularly preferably 1:10 to 10:1.

In the fungicide composition of the present invention, a fertilizer, a solid carrier, a thickener, a surfactant, a spreader, an additive, a solvent and the like may be contained, as long as they do not exert influence on the effect of the present invention.

As the fertilizer, compost, oil cake, fish meal, cow manure, chicken manure, or an organic material obtained by processing each of them; a nitrogen fertilizer, such as ammonium sulfate, ammonium nitrate, lime nitrate or urea; a phosphate fertilizer, such as calcium superphosphate, ammonium phosphate monobasic or fused magnesium phosphate; a potassium fertilizer, such as potassium chloride, potassium sulfate or potassium nitrate; a magnesium fertilizer, such as magnesium lime; a lime fertilizer, such as slaked lime; a silicate fertilizer, such as potassium silicate; a boron fertilizer, such as a borate; a chemical fertilizer containing any of various inorganic fertilizers; or the like may be exemplified.

As the solid carrier, a vegetable powder, such as soybean grain or wheat flour; a mineral fine powder, such as silicon dioxide, diatomaceous earth, apatite, gypsum, talc, bentonite, pyrophyllite, clay or joint soil; or the like may be exemplified.

As the additive, an organic or inorganic compound, such as sodium benzoate, urea or mirabilite; rapeseed oil, soybean oil, sunflower oil, castor oil, pine oil, cottonseed oil, a derivative of any of these oils, an oil concentrate of any of these oils, or the like may be exemplified.

As the solvent, kerosene, xylene; a petroleum fraction such as solvent naphtha; cyclohexane, cyclohexanone, dimethylformamide, dimethyl sulfoxide, alcohol, acetone, methyl isobutyl ketone, mineral oil, vegetable oil, water, or the like may be exemplified.

As the surfactant, a nonionic surfactant, such as a polyoxyethylene-added alkyl phenyl ether, a polyoxyethylene-added alkyl ether, a polyoxyethylene-added higher fatty acid ester, a polyoxyethylene-added sorbitan higher fatty acid ester or a polyoxyethylene-added tristyryl phenyl ether, a sulfuric acid ester salt of a polyoxyethylene-added alkyl phenyl ether, an alkylbenzene sulfonate, a sulfuric acid ester salt of a higher alcohol, an alkylnaphthalene sulfonate, polycarboxylate, lignin sulfonate, a formaldehyde condensate of an alkylnaphthalene sulfonate, an isobutylene-maleic anhydride copolymer, or the like may be exemplified.

In the agricultural and horticultural fungicide composition of the present invention, another fungicide, an insecticide, an acaricide, a nematicide, a soil pesticide, an anthelmintic, a synergist, and the like may further be contained, as long as they do not lower the effect of the present invention.

Typical examples of the another fungicide, the insecticide, the acaricide, the nematicide, the soil pesticide, the anthelmintic, and a plant growth regulator are shown below.

Fungicide:
(1) Nucleic Acid Biosynthesis Inhibitor:
  (a) RNA polymerase I inhibitor: benalaxyl, benalaxyl-M, furalaxyl, metalaxyl, metalaxyl-M, oxadixyl, clozylacon and off-race;
  (b) Adenosine deaminase inhibitor: bupirimate, dimethirimol and ethirimol;
  (c) DNA/RNA synthesis inhibitor: hymexazol and octhilinone; and
  (d) DNA topoisomerase II inhibitor: oxolinic acid.
(2) Mitotic Inhibitor and Cell Division Inhibitor:
  (a) β-Tubulin polymerization inhibitor: benomyl, carbendazim, chlorfenazole, fuberidazole, thiabendazole, thiophanate, thiophanate-methyl, diethofencarb, zoxamide and ethaboxam;
  (b) Cell division inhibitor: pencycuron; and
  (c) Inhibitor of spectrin-like protein delocalization: fluopicolide.

(3) Respiratory Inhibitor:
  (a) Complex I NADH oxidoreductase inhibitor: diflumetorim and tolfenpyrad;
  (b) Complex II succinic acid dehydrogenase inhibitor: benodanil, flutolanil, mepronil, isofetamid, fluopyram, fenfuram, furmecyclox, carboxin, oxycarboxin, thifluzamide, benzovindiflupyr, bixafen, fluxapyroxad, flametopir, isopyrazam, penflufen, penthiopyrad, sedaxane, boscalid, pyraziflumid, pydiflumetofen, isoflucypram and inpyrfluxam;
  (c) Complex III ubiquinol oxidase Qo inhibitor: azoxystrobin, coumoxystrobin, coumethoxystrobin, enoxastrobin, flufenoxystrobin, picoxystrobin, pyraoxystrobin, pyraclostrobin, pyrametostrobin, triclopyricarb, kresoxim-methyl, trifloxystrobin, dimoxystrobin, fenaminstrobin, metominostrobin, orysastrobin, famoxadone, fluoxastrobin, fenamidone, pyribencarb, mandestrobin and metyltetraprole;
  (d) Complex III ubiquinol reductase Qi inhibitor: cyazofamid, amisulbrom and fenpicoxamid;
  (e) Oxidative phosphorylation uncoupler: binapacryl, meptyldinocap, dinocap, fluazinam and ferimzone;
  (f) Oxidative phosphorylation inhibitor (inhibitor of ATP synthetase): fentin acetate, fentin chloride and fentin hydroxide; and
  (g) Complex III: Qx (unknown) inhibitor of cytochrome bc1 (ubiquinone reductase): ametoctradin.
(4) Amino Acid and Protein Synthesis Inhibitor
  (a) Methionine biosynthesis inhibitor: andoprim, cyprodinil, mepanipyrim and pyrimethanil; and
  (b) Protein synthesis inhibitor: blasticidin-S, kasugamycin, kasugamycin hydrochloride, streptomycin and oxytetracycline.
(5) Signal Transduction Inhibitor:
  (a) Signal transduction inhibitor: quinoxyfen and proquinazid; and
  (b) MAP/histidine kinase inhibitor in osmotic pressure signal transduction: fenpiclonil, fludioxonil, chlozolinate, iprodione, procymidone and vinclozolin.
(6) Lipid and Cell Membrane Synthesis Inhibitor:
  (a) Phospholipid biosynthesis, methyltransferase inhibitor: edifenphos, iprobenfos, pyrazophos and isoprothiolane;
  (b) Peroxidative agent of lipid: biphenyl, chloroneb, dicloran, quintozene, tecnazene, tolclofos methyl and etridiazole;
  (c) Agent acting on cell membrane: iodocarb, propamocarb, propamocarb hydrochloride, propamocarb fosetylate and prothiocarb;
  (d) Microorganism disrupting pathogen cell membrane: *Bacillus subtilis*, *Bacillus subtilis* strain QST713, *Bacillus subtilis* strain FZB24, *Bacillus subtilis* strain MBI600, *Bacillus subtilis* strain D747 and *Bacillus amyloliquefaciens*; and
  (e) Agent disrupting cell membrane: extract of *Melaleuca alternifolia* (tea tree).
(7) Inhibitor of Cell Membrane Sterol Biosynthesis:
  (a) Inhibitor of C14-position demethylation in sterol biosynthesis: triforine, pyrifenox, pyrisoxazole, fenarimol, flurprimidol, nuarimol, imazalil, imazalil sulfate, oxpoconazole fumarate, pefurazoate, prochloraz, triflumizole, biniconazole, azaconazole, bitertanol, bromuconazole, cyproconazole, diclobutrazol, difenoconazole, diniconazole, diniconazole-M, epoxiconazole, etaconazole, fenbuconazole, fluquinconazole, flusilazole, flutriafol, fluconazole, fluconazole-cis, hexaconazole, imibenconazole, ipconazole, metconazole, myclobutanil, penconazole, propiconazole, fluquinconazole, simeconazole, tebuconazole, tetraconazole, triadimefon, triadimenol, triticonazole, prothioconazole, voriconazole and mefentrifluconazole;

(b) Inhibitor of Δ14 reductase and Δ8→Δ7-isomerase in sterol biosynthesis: aldimorph, dodemorph, dodemorph acetate, fenpropimorph, tridemorph, fenpropidin, piperalin and spiroxamine;

(c) 3-Keto reductase inhibitor in C4-position demethylation of sterol biosynthesis system: fenhexamid and fenpyrazamine; and (d) Squalene epoxidase inhibitor of sterol biosynthesis system: pyributicarb, naftifine and terbinafine.

(8) Cell Wall Synthesis Inhibition (a) Trehalase inhibitor: validamycin;

(b) Chitin synthetase inhibitor: polyoxin and polyoxorim; and (c) Cellulose synthetase inhibitor: dimethomorph, flumorph, pyrimorph, benthiavalicarb-isopropyl, iprovalicarb, tolprocarb, valifenalate and mandipropamid.

(9) Melanin Biosynthesis Inhibitor (a) Reductase inhibitor of melanin biosynthesis: fthalide, pyroquilon and tricyclazole;

(b) Dehydratase inhibitor of melanin biosynthesis: carpropamid, diclocymet and fenoxanil; and (c) Polyketide synthesis inhibitor of melanin biosynthesis: tolprocarb.

(10) Resistance Inducing Agent of Host Plant:

(a) Agent acting on salicylic acid synthetic route: acibenzolar-S-methyl; and (b) Others: probenazole, tiadinil, isotianil, dichlobentiazox, laminarin and *Polygonum sachalinense* extract.

(11) Agent with unknown action: cymoxanil, fosetyl aluminum, phosphoric acid (phosphate), tecloftalam, triazoxide, flusulfamide, diclomezine, methasulfocarb, cyflufenamid, metrafenone, pyriofenone, dodine, dodine free base and flutianil.

(12) Agent having many active sites: copper (copper salt), Bordeaux mixture, copper hydroxide, copper naphthalate, copper oxide, copper oxychloride, copper sulfate, sulfur, sulfur product, calcium polysulfide, ferbam, mancozeb, maneb, mancopper, metiram, polycarbamate, propineb, thiram, zineb, ziram, captan, captafol, folpet, chlorothalonil, dichlofluanid, tolylfluanid, guazatine, iminoctadine acetate, iminoctadine albesilate, anilazine, dithianon, quinomethionate and fluoroimide.

(13) Other agents: DBEDC, fluorofolpet, guazatine acetate, bis(8-quinolinolato)copper(II), propamidine, chloropicrin, cyprofuram, *Agrobacterium*, bethoxazin, diphenylamine, methyl isothianate (MITC), mildiomycin, capsaicin, cufraneb, cyprosulfamide, dazomet, debacarb, dichlorophen, flumetover, fosetyl calcium, fosetyl sodium, irumamycin, natamycin, nitrothal-isopropyl, oxamocarb, pyrrolnitrin, tebufloquin, tolnifanide, zarilamid, algophase, amicarthiazol, oxathiapiprolin, metiram zinc, benthiazole, trichlamide, uniconazole, mildiomycin, oxyfenthiin, picarbutrazox, fenpicoxamid, dichlobentiazox, quinofumerinthiuram, amobam, *Agrobacterium radiobacter, Coniothyrium minitans, Pseudomonas fluorescens, Pseudomonas rhodesiae, Talaromyces flavus, Trichoderma atroviride*, nonpathogenic *Erwinia carotovora, Bacillus simplex, Variovorax paradox, Lactobacillus plantarum*, florylpicoxamid, pyrapropoyne, fluindapyr, aminopyrifen and pyridachlometyl.

Insecticide, Acaricide, Etc.:

(1) Acetylcholinesterase Inhibitor:

(a) Carbamate-based: alanycarb, aldicarb, bendiocarb, benfuracarb, butocarboxim, butoxycarboxim, carbaryl, carbofuran, carbosulfan, ethiofencarb, fenobcarb, formetanate, furathiocarb, isoprocarb, methiocarb, methomyl, oxamyl, pirimicarb, propoxur, thiodicarb, thiofanox, triazamate, trimethacarb, XMC, xylylcarb, fenothiocarb, MIPC, MPMC, MTMC, aldoxycarb, allyxycarb, aminocarb, bufencarb, chloethocarb, metam sodium and promecarb.

(b) Organophosphorus-based: acephate, azamethiphos, azinphos-ethyl, azinphos-methyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isocarbophos, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridafenthion, quinalphos, sulfotep, tebupirimfos, temefos, terbufos, tetrachlorvinphos, thiometon, triazophos, trichlorfon, vamidothion, bromophosethyl, BRP, carbophenothion, cyanofenphos, CYAP, demeton-S-methylsulfon, dialifos, dichlofenthion, dioxabenzofos, etrimfos, fensulfothion, flupyrazofos, fonophos, formothion, phosmethylan, isazophos, iodofenphos, methacrifos, pirimiphos-ethyl, phosphocarb, propaphos, prothoate and sulprofos.

(2) GABA-gated chloride channel antagonist: acetoprole, chlordane, endosulfan, ethiprole, fipronil, pyrafluprole, pyriprole, camphechlor, heptachlor and dienochlor.

(3) Sodium channel modulator: acrinathrin, d-cis-trans allethrin, d-trans allethrin, bifenthrin, bioallethrin, bioallethrin s-cyclopentyl isomer, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin[(1R)-trans isomer], deltamethrin, empenthrin [(EZ)-(1R)-isomer], esfenvalerate, etofenprox, fenpropathrin, fenvalerate, flucythrinate, flumethrin, tau-fluvalinate, halfenprox, imiprothrin, kadethrin, permethrin, phenothrin [(1R)-trans isomer], prallethrin, pyrethrum, resmethrin, silafluofen, tefluthrin, tetramethrin[(1R)-isomer], tralomethrin, transfluthrin, allethrin, pyrethrin, pyrethrin I, pyrethrin II, profluthrin, dimefluthrin, bioethanomethrin, biopermethrin, transpermethrin, fenfluthrin, fenpyrithrin, flubrocythrinate, flufenprox, metofluthrin, protrifenbute, pyresmethrin and terallethrin.

(4) Nicotinic acetylcholine receptor agonist: acetamiprid, clothianidin, dinotefuran, imidacloprid, nitenpyram, nithiazin, thiacloprid, thiamethoxam, sulfoxaflor, nicotine, flupyradifurone and flupyrimin.

(5) Nicotinic acetylcholine receptor allosteric modulator: spinetoram and spinosad.

(6) Chloride channel activator: abamectin, emamectin benzoate, lepimectin, milbemectin, ivermectin, selamectin, doramectin, eprinomectin, moxidectin, milbemycin, milbemycin oxime and nemadectin.

(7) Juvenile hormone-like compound: hydroprene, kinoprene, methoprene, fenoxycarb, pyriproxyfen, diofenolan, epofenonane and triprene.

(8) Other nonspecific inhibitors: methyl bromide, chlorpicrin, sulfuryl fluoride, borax and tartar emetic.

(9) Homoptera selective antifeedant: flonicamid, pymetrozin and pyrifluquinazon.

(10) Acari growth inhibitor: clofentezine, diflovidazin, hexythiazox and etoxazole.

(11) Microorganism-originated insect midgut intima-destroying agent: *Bacillus thuringiensis* var. *israelensis, Bacil*-

*lus sphaericus, Bacillus thuringiensis* var. *aizawai, Bacillus thuringiensis* var. *kurstaki, Bacillus thuringiensis* var. *tenebrionis*, and Bt crop protein: Cry1Ab, Cry1Ac, Cry1Fa, Cry1A.105, Cry2Ab, Vip3A, mCry3A, Cry3Ab, Cry3Bb and Cry34Ab1/Cry35Ab1.

(12) Mitochondrial ATP biosynthetase inhibitor: diafenthiuron, azocyclotin, cyhexatin, fenbutatin oxide, propargite and tetradifon.

(13) Oxidative phosphorylation uncoupler: chlorfenapyr, sulfluramid, DNOC, binapacryl, dinobuton and dinocap.

(14) Nicotinic acetylcholine receptor channel blocker: bensultap, cartap hydrochloride, nereistoxin, thiosultap-sodium salt and thiocyclam.

(15) Chitin synthesis inhibitor: bistrifluron, chlorfluazuron, diflubenzuron, flucycloxuron, flufenoxuron, hexaflumuron, lufenuron, novaluron, noviflumuron, teflubenzuron, triflumuron, buprofezin and fluazuron.

(16) Diptera molting disruptor: cyromazine.

(17) Molting hormone receptor agonist: chromafenozide, halofenozide, methoxyfenozide and tebufenozide.

(18) Octopamine receptor agonist: amitraz, demiditraz and chlordimeform.

(19) Mitochondrial electron transport complex III inhibitor: acequinocyl, fluacrypyrim and hydramethylnon.

(20) Mitochondrial electron transport complex I inhibitor: fenazaquin, fenpyroximate, pyrimidifen, pyridaben, tebufenpyrad, tolfenpyrad and rotenone.

(21) Voltage-dependent sodium channel blocker: indoxacarb and metaflumizon.

(22) Acetyl CoA carboxylase inhibitor: spirodiclofen, spiromesifen and spirotetramat.

(23) Mitochondrial electron transport complex IV inhibitor: aluminum phosphide, calcium phosphide, phosphine, zinc phosphide and cyanide.

(24) Mitochondrial electron transport complex II inhibitor: cyenopyrafen, cyflumetofen and pyflubumide.

(25) Ryanodine receptor modulator: chlorantraniliprole, cyantraniliprole, flubendiamide, cyclaniliprole and tetraniliprole.

(26) Mixed function oxidase inhibitor compound: piperonyl butoxide.

(27) Latrophilin receptor agonist: depsipeptide, cyclic depsipeptide, 24-membered cyclic depsipeptide and emodepside.

(28) Other agents (unknown action mechanism): azadirachtin, benzoximate, bifenazate, bromopropylate, quinomethionate, cryolite, dicofol, pyridalyl, benclothiaz, sulfur, amidoflumet, 1,3-dichloropropene, DCIP, phenisobromolate, benzomate, metaldehyde, chlorobenzilate, clothiazoben, dicyclanil, fenoxacrim, fentrifanil, flubenzimine, fluphenazine, gossyplure, japonilure, metoxadiazone, petroleum, potassium oleate, tetrasul, triaracene, afidopyropen, flometoquin, flufiprole, fluensulfone, meperfluthrin, tetramethylfluthrin, tralopyril, dimefluthrin, methylneodecanamide, fluralaner, afoxolaner, fluxametamide, 5-[5-(3,5-dichlorophenyl)-5-trifluoromethyl-4,5-dihydroisoxazol-3-yl]-2-(1H-1,2,4-triazol-1-yl)benzonitrile (CAS: 943137-49-3), broflanilide, other meta-diamides, *Steinernema carpocapsae, Steinernema glaseri, Pasteuria penetrans, Paecilomyces tenuipes, Paecilomyces fumosoroseus, Beauveria bassiana, Beauveria brongniartii, Metarhizium anisopliae, Verticillium lacanii* and acynonapyr.

(29) Anthelmintic:

(a) Benzimidazole-based: fenbendazole, albendazole, triclabendazole, oxibendazole, mebendazole, oxfendazole, parbendazole, flubendazole, febantel, netobimin, thiophanate, thiabendazole and cambendazole;

(b) Salicylanilide-based: closantel, oxyclozanide, rafoxanide and niclosamide;

(c) Substituted phenol-based: nitroxinil and nitroscanate;

(d) Pyrimidine-based: pyrantel and morantel;

(e) Imidazothiazole-based: levamisole and tetramisole;

(f) Tetrahydropyrimidine-based: praziquantel and epsiprantel; and (g) Other anthelmintics: cyclodiene, ryania, clorsulon, metronidazole, demiditraz, piperazine, diethylcarbamazine, dichlorophen, monepantel, tribendimidine, amidantel, thiacetarsamide, melarsomine and arsenamide.

Plant Growth Regulator:

abscisic acid, kinetin, benzylaminopurine, 1,3-diphenylurea, forchlorfenuron, thidiazuron, chlorfenuron, dihydrozeatin, gibberellin A, gibberellin A4, gibberellin A7, gibberellin A3, 1-methylcyclopropane, N-acetyl aminoethoxyvinylglycine, (alias: aviglycine), (aminooxy)acetic acid, silver nitrate, cobalt chloride, IAA, 4-CPA, cloprop, 2,4-D, MCPB, indole-3-butyric acid, dichlorprop, phenothiol, 1-naphthylacetamide, ethychlozate, cloxyfonac, maleic hydrazide, 2,3,5-triiodobenzoic acid, salicylic acid, methyl salicylate, (−)-jasmonic acid, methyl jasmonate, (+)-strigol, (+)-deoxystrigol, (+)-orobanchol, (+)-sorgolactone, 4-oxo-4-(2-phenylethyl)aminobutyric acid, ethephon, chlormequat, mepiquat chloride, benzyladenine, 5-aminolevulinic acid and daminozide.

The fungicide composition of the present invention is not particularly limited by a production method therefor. As a method for producing the fungicide composition of the present invention, (a) a method including formulating the compound A and the compound B separately and mixing these formulations, (b) a method including formulating the compound A and mixing the formulation with the compound B, (c) a method including formulating the compound B and mixing the formulation with the compound A, (d) a method including mixing the compound A and the compound B, and if necessary, formulating the mixture, or the like may be exemplified. By the formulating, a dosage form, such as a water dispersible powder, an emulsion, a powder, a granule, a water soluble powder, a suspension, a water dispersible granule or a tablet, may be made.

An active ingredient concentration (total concentration of compound A and compound B) in the formulated fungicide composition of the present invention is not particularly limited, and may be any of various concentrations according to the aforesaid form of the formulation. For example, in the water dispersible powder, the concentration may be usually 5 to 90% by weight, and preferably 10 to 85% by weight; in the emulsion, the concentration may be usually 3 to 70% by weight, and preferably 5 to 60% by weight; and in the granule, the concentration may be usually 0.01 to 50% by weight, and preferably 0.05 to 40% by weight.

Some formulation examples are given below. The following formulations given below are just examples and may be modified as long as the modification is not against the spirit of the present invention, and the present invention is in no way limited by the following formulation examples. Unless otherwise noted, "part(s)" means "part(s) by weight."

(Formulation 1: Water Dispersible Powder)

| | |
|---|---|
| Compound A + Compound B | 40 parts |
| Diatomaceous earth | 53 parts |
| Higher alcohol sulfuric acid ester | 4 parts |
| Alkylnaphthalene sulfonate | 3 parts |

These are homogeneously mixed and finely pulverized, thereby obtaining a water dispersible powder having an active ingredient concentration of 40%.
(Formulation 2: Emulsion)

| | |
|---|---|
| Compound A + Compound B | 30 parts |
| Xylene | 33 parts |
| Dimethylformamide | 30 parts |
| Polyoxyethylene alkyl allyl ether | 7 parts |

These are mixed and dissolved, thereby obtaining an emulsion having an active ingredient concentration of 30%.
(Formulation 3: Powder)

| | |
|---|---|
| Compound A + Compound B | 10 parts |
| Clay | 90 parts |

These are homogeneously mixed and finely pulverized, thereby obtaining a powder having an active ingredient concentration of 10%.
(Formulation 4: Granule)

| | |
|---|---|
| Compound A + Compound B | 5 parts |
| Clay | 73 parts |
| Bentonite | 20 parts |
| Dioctyl sulfosuccinate sodium salt | 1 part |
| Potassium phosphate | 1 part |

These are well pulverized and mixed, water is added, and the resulting mixture is well kneaded, then granulated and dried, thereby obtaining a granule having an active ingredient concentration of 5%.
(Formulation 5: Suspension)

| | |
|---|---|
| Compound A + Compound B | 10 parts |
| Polyoxyethylene alkyl allyl ether | 4 parts |
| Polycarboxylic acid sodium salt | 2 parts |
| Glycerin | 10 parts |
| Xanthan gum | 0.2 parts |
| Water | 73.8 parts |

These are mixed and wet-pulverized until the particle size becomes 3 microns or less, thereby obtaining a suspension having an active ingredient concentration of 10%.
(Formulation 6: Water Dispersible Granule)

| | |
|---|---|
| Compound A + Compound B | 40 parts |
| Clay | 36 parts |
| Potassium chloride | 10 parts |
| Alkylbenzenesulfonic acid sodium salt | 1 part |
| Lignosulfonic acid sodium salt | 8 parts |
| Formaldehyde condensate of alkylbenzenesulfonic acid sodium salt | 5 parts |

These are homogeneously mixed and finely pulverized, thereafter an appropriate amount of water is added, and they are kneaded to form a clay-like substance. The clay-like substance is granulated and then dried, thereby obtaining a water dispersible granule having an active ingredient concentration of 40%.

The agricultural and horticultural fungicide composition of the present invention may sometimes exert an effect such as labor saving by using the composition together with an insecticide, an acaricide, an herbicide, a plant growth regulator or the like which are known.

The fungicide composition of the present invention may be used by spraying it on a plant, or by irrigating or admixing it with a soil, or spraying it on a soil, as it is or after diluted to a prescribed concentration with water, or in the form of a solution, a suspension or an emulsion. The fungicide composition of the present invention is usually applied to a field in an appropriate amount of 0.1 g or more per hectare in terms of active ingredients (total amount of compound A and compound B).

The fungicide composition of the present invention may be used also as a seed treatment agent. The fungicide composition may also be used by application on water surface.

As useful plants that become objects of treatment with the fungicide composition of the present invention, grains, vegetables, root vegetables, tubers and roots, fruit trees, trees, grasses, lawn grasses, or the like may be exemplified. Parts of these plants may be treated as the objects herein. As each part of the plants, a leaf, a stem, a stalk, a flower, a bud, a fruit, a seed, a sprout, a root, a tuber, a tuberous root, a shoot, a cutting or the like may be exemplified. Further, improved breeds/varieties, cultivars, mutants, hybrids, and gene recombinants (GMO) of these plants may also be treated as the objects.

Hereinafter, some examples of useful plants are specifically given.

(1) Plant of Malvaceae, e.g., okra (*Abelmoschus esculentus*) and cotton (*Gossypium hirsutum*);
(2) Plant of Sterculiaceae, e.g., cacao (*Theobroma cacao*);
(3) Plant of Chenopodiaceae, e.g., sugar beet (*Beta vulgaris*), Swiss chard (*Beta vulgaris* var. *cicla* L.) and spinach (*Spinacia oleracea*);
(4) Plant of Rubiaceae, e.g., coffee (*Coffea* spp.);
(5) Plant of Cannabaceae, e.g., hop (*Humulus lupulus*);
(6) Plant of Cruciferae, e.g., Japanese mustard spinach (*Brassica cempestris*), Indian mustard (*Brassica juncea*), leaf mustard (*Brassica juncea* var. *integrifolia*), rapeseed (*Brassica napus*), cauliflower (*Brassica oleracea* var. *Botrytis*), cabbage (*Brassica oleracea* var. *capitata*), broccoli (*Brassica oleracea* var. *italica*), Chinese cabbage (*Brassica rapa*), bok choy (*Brassica rapa* var. *chinensis*), turnip (*Brassica rapa* var. *glabra*), nozawana (*Brassica rapa* var. *hakabura*), potherb mustard (*Brassica rapa* var. *lancinifolia*), shepherd's purse (*Capsella bursa-pastoris*), watercress (*Nasturtium* spp.), radish (*Raphanus sativus*) and Wasabi (*Wasabia japonica*);
(7) Plant of Linaceae, e.g., flax (*Linaceae usitatissimum*);
(8) Plant of Gramineae, e.g., oat (*Avena sativa*), Job's tears (*Coix lacryma-jobi* var. *ma-yuen*), orchard grass (*Dactylis glomerata*), barley (*Hordeum vulgare*), rice (*Oryza sativa*), timothy (*TPhleum pratense*), sugarcane (*Saccharum officinarum*), rye (*Secale cereale*), foxtail millet (*Setaria italica*), bread wheat (*Triticum aestivum*), corn (*Zea mays*) and lawn grass (*Zoysia* spp.);
(9) Plant of Cucurbitaceae, e.g., wax gourd (*Benincasa hispida*), watermelon (*Citrulus lanatus*), western pumpkin (*Cucurbita maxima*), oriental pumpkin (*Cucurbita moschata*), field pumpkin (zucchini) (*Cucurbita pepo*), bottle gourd (*Lagenaria siceraria*) and sponge gourd (*Luffa cylindrica*);
(10) Plant of Anacardiaceae, e.g., cashew nut tree (*Anacardium*) and mango (*Mangifera*);
(11) Plant of Ebenaceae, e.g., persimmon (*Diospyros kaki*);
(12) Plant of Betulaceae, e.g., cobnut (*Corylus avellana*);
(13) Plant of Compositae, e.g., mugwort (*Artemisia indica* var. *maximowiczii*), burdock (*Arctium lappa* L.), chicory (*Cichorium intybus*), artichoke (*Cynara scolymus*), crown daisy (*Glebionis coronaria*), sunflower (*Helianthus annuus*) and lettuce (*Lactuca sativa*);
(14) Plant of Asparagaceae, e.g., Asparagus (*Asparagus officinalis* L.);
(15) Plant of Moraceae, e.g., fig (*Ficus carica* L.);
(16) Plant of Juglandaceae, e.g., walnut (*Juglans* spp.);
(17) Plant of Pedaliaceae, e.g., sesame (*Sesamum indicum*);
(18) Plant of Piperaceae, e.g., pepper (*Piper nigrum*);
(19) Plant of Araceae, e.g., konjac (*Amorphophallus rivieri* var. *konjac*) and taro (*Colocasia esculenta*);
(20) Plant of Lamiaceae, e.g., mint (*Mentha* spp.), basil (*Ocimum basilicum*), Perilla (*Perilla frutescens* Var. *crispa*) and sage (*Salvia officinalis*);
(21) Plant of Zingiberaceae, e.g., turmeric (*Curcuma longa*), ginger (*Hedychium* spp.) and Japanese ginger (*Zingiber mioga*);
(22) Plant of Umbelliferae, e.g., celery (*Apium graveolens* L.), carrot (*Daucus carota* var. *sativa*), Japanese parsley (*Oenanthe javanica*), Japanese royal fern (*Osmunda japonica* Thunb) and parsley (*Petroselium crispum*);
(23) Plant of Grossulariaceae, e.g., gooseberry (*Ribes uva-crispa*);
(24) Plant of Polygonaceae, e.g., buckwheat (*Fagopyrum esculentum*);
(25) Plant of Ericaceae, e.g., blueberry (*Vaccinium* spp.);
(26) Plant of Theaceae, e.g., tea plant (*Camellia sinensis*);
(27) Plant of Solanaceae, e.g., chili pepper (*Capsicum annuum*), green pepper (*Capsicum annuum* var. 'grossum'), tomato (*Lycopersicon esculentum*), tobacco (*Nicotiana tabacum*), eggplant (*Solanum melongena*) and potato (*Solanum tuberosum*);
(28) Plant of Bromeliaceae, e.g., pineapple (*Ananas comosus*);
(29) Plant of Musaceae, e.g., banana (*Musa* spp.);
(30) Plant of Nelumbonaceae, e.g., lotus (*Nelumbo nucifera*);
(31) Plant of Caricaceae, e.g., papaya (*Carica papaya*);
(32) Plant of Rosaceae, e.g., Chinese quince (*Chaenomeles sinensis*), loquat (*Eriobotrya japonica* Lindl.), strawberry (*Fragaria* spp.), apple (*Malus pumila*), apricot (*Prunus armeniaca*), sweet cherry (*Prunus avium*), sour cherry (*Prunus cerasus*), almond (*Prunus dulcis*), ume (*Prunus mume*), peach (*Prunus persica*), Japanese plum (*Prunus salicina*), Japanese pear (*Pyrus pyrifolia* var. *culta*), pear (*Pyrus communis*) and blackberry (*Rubus* spp.); (33) Plant of Convolvulaceae, e.g., sweet potato (*Ipomoea batatas* Lam. var. *edulis* Makino);
(34) Plant of Vitaceae, e.g., grape (*Vitis* spp.);
(35) Plant of Fagaceae, e.g., chestnut (*Castanea crenata* Sieb. Et Zucc.);
(36) Plant of Actinidiaceae, e.g., kiwifruit (*Actinidia deliciosa*);
(37) Plant of Leguminosae, e.g., peanut (*Arachis hypogaea*), soybean (*Glycine max* subsp. *max*), *Glycine soja* (*Glycine max* subsp. *soja*), lentil (*Lens culinaris*), alfalfa (*Medicago sativa*), pea (*Pisum sativum* L.), kidney bean (*Phaseolus vulgaris*), narrow-leaved vetch (*Vicia angustifolia*), broad bean (*Vicia faba*) and adzuki bean (*Vigna angularis*);
(38) Plant of Rutaceae, e.g., yuzu (*Citrus junos*), Kishu mikan (*Citrus kinokuni*), lemon (*Citrus limon*), orange (*Citrus sinensis*), Unshu mikan (*Citrus unshiu*), grapefruit (*Citrus X paradisi*), kumquat (*Fortunella japonica*) and Japanese pepper (*Zanthoxylum piperitum*);
(39) Plant of Oleaceae, e.g., jasmine (*Jasminum* spp.) and olive (*Olea europaea*);

(40) Plant of Dioscoreaceae, e.g., Japanese yam (*Dioscorea japonica* Thunb.) and Chinese yam (*Dioscorea batatas*);
(41) Plant of Liliaceae, e.g., onion (*Allium cepa*), welsh onion (*Allium fistulosum*), garlic (*Allium sativum*), chive (*Allium schoenoprasum*), Chinese chive (*Allium tuberosum*) and tulip (*Tulipa gesneriana*).

The fungicide composition of the present invention may be used for controlling plant diseases derived from filamentous fungi over a wide range of types, such as fungi belonging to Oomycetes, Ascomycetes, Deuteromycetes, Basidiomycetes and Zygomycetes.

Examples of plant diseases and pathogens that become objects of control are given below.

Sugar beet: Cercospora leaf spot (*Cercospora beticola*), Aphanomyces root rot (*Aphanomyces cochloides*), root rot (*Thanatephorus cucumeris*), leaf blight (*Thanatephorus cucumeris*), rust (*Uromyces betae*), powdery mildew (*Oidium* sp.), Ramularia leaf spot (*Ramularia beticola*), damping-off (*Aphanomyces cochlioides, Pythium ultimum*), etc.

Peanut: brown leaf spot (*Mycosphaerella arachidis*), Ascochyta leaf spot (*Ascochyta* sp.), rust (*Puccinia arachidis*), damping-off (*Pythium debaryanum*), Alternaria leaf spot (*Alternaria alternata*), southern blight (*Sclerotium rolfsii*), leaf spot (*Mycosphaerella berkeleyi*), etc.

Cucumber: powdery mildew (*Sphaerotheca fuliginea*), downy mildew (*Pseudoperonospora cubensis*), gummy stem blight (*Mycosphaerella melonis*), Fusarium wilt (*Fusarium oxysporum*), Sclerotinia rot (*Sclerotinia sclerotiorum*), gray mold (*Botrytis cinerea*), anthracnose (*Colletotrichum orbiculare*), scab (*Cladosporium cucumerinum*), Corynespora leaf spot (*Corynespora cassiicola*), damping-off (*Pythium debaryanum, Rhizoctonia solani* Kuhn), Phomopsis root rot (*Phomopsis* sp.), bacterial spot (*Pseudomonas syringae* pv. *Lachrymans*), etc.

Tomato: gray mold (*Botrytis cinerea*), leaf mold (*Cladosporium fulvum*), late blight (*Phytophthora infestans*), Verticillium wilt (*Verticillium albo-atrum, Verticillium dahliae*), powdery mildew (*Oidium neolycopersici*), early blight (*Alternaria solani*), sooty mold (*Pseudocercospora fuligena*), etc.

Eggplant: gray mold (*Botrytis cinerea*), black blight (*Corynespora melongenae*), powdery mildew (*Erysiphe cichoracearum*), sooty mold (*Mycovellosiella nattrassii*), stem rot (*Sclerotinia sclerotiorum*), Verticillium wilt (*Verticillium dahliae*), brown spot (*Phomopsis vexans*), etc.

Strawberry: gray mold (*Botrytis cinerea*), powdery mildew (*Sphaerotheca humuli*), anthracnose (*Colletotrichum acutatum, Colletotrichum fragariae*), Phytophthora rot (*Phytophthora cactorum*), soft rot (*Rhizopus stolonifer*), Fusarium wilt (*Fusarium oxysporum*), Verticillium wilt (*Verticillium dahliae*), etc.

Onion: gray-mold neck rot (*Botrytis allii*), gray mold (*Botrytis cinerea*), Botrytis leaf blight (*Botrytis squamosa*), downy mildew (*Peronospora destructor*), leaf blight (*Phytophthora porri*), leaf blight (*Ciborinia allii*), etc.

Welsh onion: soft rot (*Pectobacterium carotovorum*), downy mildew (*Peronospora destructor*), leaf blight (*Pleospora allii*), white rot (*Sclerotium cepivorum*), rust (*Puccinia allii*), Botrytis leaf blight (*Botrytis squamosa*), etc.

Cabbage: clubroot (*Plasmodiophora brassicae*), soft rot (*Erwinia carotovora*), black rot (*Xanthomonas campesrtis* pv. *campestris*), bacterial leaf blight (*Pseudomonas syringae* pv. *maculicola, Pseudomonas syringae* pv. *alisalensis*), downy mildew (*Peronospora parasitica*), Sclerotinia rot (*Sclerotinia sclerotiorum*), Alternaria sooty spot (*Alternaria brassicicola*), gray mold (*Botrytis cinerea*), etc.

Kidney bean: stem rot (*Sclerotinia sclerotiorum*), gray mold (*Botrytis cinerea*), anthracnose (*Colletotrichum lindemuthianum*), angular leaf spot (*Phaeoisariopsis griseola*), etc.

Apple: powdery mildew (*Podosphaera leucotricha*), scab (*Venturia inaequalis*), Monilia leaf blight (*Monilinia mali*), fruit spot (*Mycosphaerella pomi*), Valsa canker (*Valsa mali*), Alternaria blotch (*Alternaria mali*), apple rust (*Gymnosporangium yamadae*), ring rot (*Botryosphaeria berengeriana*), anthracnose (*Glomerella cingulate, Colletotrichum acutatum*), blotch (*Diplocarpon mali*), fly speck (*Zygophiala jamaicensis*), sooty blotch (*Gloeodes pomigena*), violet root rot (*Helicobasidium mompa*), gray mold (*Botrytis cinerea*), fire blight (*Erwinia amylovora*), etc.

Ume: scab (*Cladosporium carpophilum*), gray mold (*Botrytis cinerea*), brown rot (*Monilinia mumecola*), sooty blotch (*Peltaster* sp.), etc.

Persimmon: powdery mildew (*Phyllactinia kakicola*), anthracnose (*Gloeosporium kaki*), angular leaf spot (*Cercospora kaki*), circular leaf spot (*Mycosphaerella nawae*), etc.

Peach: brown rot (*Monilinia fructicola*), scab (*Cladosporium carpophilum*), Phomopsis rot (*Phomopsis* sp.), bacterial shot hole (*Xanthomonas campestris* pv. *pruni*), leaf curl (*Taphrina deformans*) and anthracnose (*Colletotrichum gloeosporioides*)

Almond: brown rot (*Monilinia laxa*), shot hole (*Stigmina carpophila*), scab (*Cladosporium carpophilum*), leaf blister (*Polystigma rubrum*), Alternaria leaf spot (*Alternaria alternata*), anthracnose (*Colletotrichum gloeospoides*), etc.

Cherry: brown rot (*Monilinia fructicola*), anthracnose (*Colletotrichum acutatum*), black rot (*Alternaria* sp.), young-fruit rot (*Monilinia kusanoi*), Cylindrosporium leaf spot (*Mycosphaerella cerasella*), etc.

Grape: gray mold (*Botrytis cinerea*), powdery mildew (*Uncinula necator*), ripe rot (*Glomerella cingulata, Colletotrichum acutatum*), downy mildew (*Plasmopara viticola*), bird's eye rot (*Elsinoe ampelina*), leaf blight (*Pseudocercospora vitis*), black rot (*Guignardia bidwellii*), white rot (*Coniella castaneicola*), rust (*Phakopsora ampelopsidis*), cottony bunch, etc.

Pear: scab (*Venturia nashicola*), Gymnosporangium rust (*Gymnosporangium asiaticum*), black spot (*Alternaria kikuchiana*), ring rot (*Botryosphaeria berengeriana*), powdery mildew (*Phyllactinia mali*), Phomopsis canker (*Phomopsis fukushii*), brown spot (*Stemphylium vesicarium*), anthracnose (*Glomerella cingulata*), etc.

Tea: gray blight (*Pestalotiopsis longiseta, P. theae*), anthracnose (*Colletotrichum theae-sinensis*), net blister blight (*Exobasidium reticulatum*), etc.

Citrus: scab (*Elsinoe fawcettii*), blue mold (*Penicillium italicum*), green mold (*Penicillium digitatum*), gray mold (*Botrytis cinerea*), melanose (*Diaporthe citri*), canker (*Xanthomonas campestris* pv. *Citri*), powdery mildew (*Oidium* sp.), Phytophthora rot (*Phytophthora citrophthora*), anthracnose (*Colletotrichum fioriniae*), etc.

Wheat: powdery mildew (*Erysiphe graminis* f.sp. *tritici, Blumeriagraminis* f.sp. *tritici*), scab (*Gibberella zeae*), leaf rust (*Puccinia recondita*), browning root rot (*Pythium iwayamai*), pink snow mold (*Monographella nivalis*), eye spot (*Pseudocercosporella herpotrichoides*), Septoria leaf spot (*Septoria tritici*), glume blotch (*Leptosphaeria nodorum*), Typhula snow blight (*Typhula incarnata*), Sclerotinia snow blight (*Myrosclerotinia borealis*), damping-off (*Gaeumannomyces graminis*), ergot (*Claviceps purpurea*), stinking smut (*Tilletia caries*), loose smut (*Ustilago nuda*), blast (*Pyricularia grisea*), etc.

Barley: stripe (*Pyrenophora graminea*), net blotch (*Pyrenophora teres*), leaf blotch (*Rhynchosporium secalis*), loose smut (*Ustilago tritici, U. nuda*), etc.

Rice: blast (*Pyricularia oryzae*), sheath blight (*Rhizoctonia solani*), Bakanae disease (*Gibberella fujikuroi*), brown spot (*Cochliobolus miyabeanus*), damping-off (*Pythium graminicola*), bacterial leaf blight (*Xanthomonas oryzae*), bacterial seeding blight (*Burkholderia plantarii*), bacterial brown stripe (*Acidovorax avenae*), bacterial grain rot (*Burkholderia glumae*), streak leaf blight (*Cercospora oryzae*), false smut of rice (*Ustilaginoidea virens*), discolored rice grains (*Alternaria alternata, Curvularia intermedia*), kernel discoloration (*Alternaria padwickii*), pink coloring of rice grains (*Epicoccum purpurascens*), etc.

Tobacco: *Sclerotinia* stem rot (*Sclerotinia sclerotiorum*), powdery mildew (*Erysiphe cichoracearum*), black shank (*Phytophthora nicotianae*), etc.

Tulip: gray mold (*Botrytis cinerea*), etc.

Sunflower: downy mildew (*Plasmopara halstedii*), Sclerotinia rot (*Sclerotinia sclerotiorum*), gray mold (*Botrytis cinerea*), etc.

Bentgrass: *Sclerotinia* snow blight (*Sclerotinia borealis*), large patch (*Rhizoctonia solani*), brown patch (*Rhizoctonia solani*), dollar spot (*Sclerotinia homoeocarpa*), blast (*Pyricularia* sp.), Pythium red blight (*Pythium aphanidermatum*), anthracnose (*Colletotrichum graminicola*), etc.

Orchard grass: powdery mildew (*Erysiphe graminis*), etc.

Soybean: purple stain (*Cercospora kikuchii*), downy mildew (*Peronospora manshurica*), Phytophthora stem and root blight (*Phytophthora sojae*), rust (*Phakopsora pachyrhizi*), Sclerotinia rot (*Sclerotinia sclerotiorum*), anthracnose (*Colletotrichum truncatum*), gray mold (*Botrytis cinerea*), scab (*Elsinoe glycines*), pod and stem blight (*Diaporthe phaseolorum* var. *sojae*), etc.

Potato: late blight (*Phytophthora infestans*), early blight (*Alternaria solani*), black scurf (*Thanatephorus cucumeris*), Verticillium wilt (*Verticillium albo-atrum, V. dahliae, V. nigrescens*), blackleg (*Pectobacterium atrosepticum*), soft rot (*Pectobacterium carotovorum*), etc.

Banana: Panama disease (*Fusarium oxysporum*), Sigatoka disease (*Mycosphaerella fijiensis, M. musicola*), etc.

Rapeseed: *Sclerotinia* rot (*Sclerotinia sclerotiorum*), root rot (*Phoma lingam*), black rot (*Alternaria brassicae*), etc.

Coffee: rust (*Hemileia vastatrix*), anthracnose (*Colletotrichum coffeanum*), Cercospora leaf spot (*Cercospora coffeicola*), etc.

Sugar cane: brown rust (*Puccinia melanocephala*), etc.

Corn: zonate leaf spot (*Gloeocercospora sorghi*), rust (*Puccinia sorghi*), southern rust (*Puccinia polysora*), smut (*Ustilago maydis*), southern leaf blight (*Cochliobolus heterostrophus*), northern leaf blight (*Setosphaeria turcica*), etc.

Cotton: damping-off (*Pythium* sp.), rust (*Phakopsora gossypii*), frosty mildew (*Mycosphaerella areola*), anthracnose (*Glomerella gossypii*), etc.

The fungicide composition of the present invention may be used for controlling the above diseases, etc.

The fungicide composition of the present invention also has an excellent fungicidal effect on resistant fungi. Moreover, since the fungicide composition exhibits an effect by application in an extremely small dose, it has an effect of preventing appearance of a new resistant fungi.

As a disease to which the fungicide composition of the present invention is more preferably applied, scab of apple, gray mold of cucumber, *Fusarium* wilt of cucumber, powdery mildew of wheat, leaf rust of wheat, *Septoria* leaf spot of wheat, late blight of tomato, blast of paddy rice, rust of soybean, or the like may be exemplified.

EXAMPLES

Next, the present invention will be described in more detail with reference to Examples. However, the present invention is in no way limited to those Examples.

Example 1 and Comparative Example 1

As the compound A, 2-{2-[(7,8-difluoro-2-methylquinolin-3-yl)oxy]-6-fluorophenyl}propan-2-ol of formula (a-1) was provided. As the compound B, silthiofam [compound of formula (b-1)] was provided. Dilute emulsions having concentrations shown in Tables 1 to 3 were each subjected to a cucumber gray mold control test.

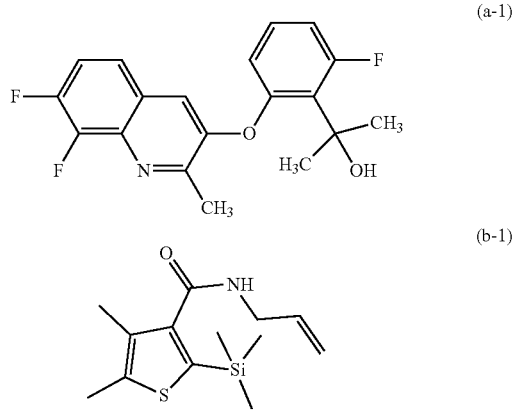

(Cucumber Gray Mold Control Test)

The compound A and the compound B were dissolved in an organic solvent and a surfactant to obtain an emulsion. The emulsion was diluted to a prescribed concentration with water. The dilute emulsion was sprayed to cotyledons of cucumber (variety: Shimoshirazu). They were naturally dried at room temperature. Thereafter, a conidiospore suspension of cucumber gray mold disease fungi (*Botrytis cinerea*) was dropwise inoculated. It was placed in a dark room at 20° C. and high humidity for 4 days. Appearance of disease spots on the leaves and that on untreated leaves were compared and studied, and a control ratio was calculated. The test was carried out in duplicate.

Based on the Colby's equation, a theoretical control ratio in the dilute emulsion prepared by using the compound A and the compound B together was calculated from a measured control ratio in the dilute emulsion prepared by using the compound A alone and that in the dilute emulsion prepared by using the compound B alone.

Colby's equation: $E = M + N - MN/100$

M: measured control ratio (%) in dilute emulsion prepared by using compound A alone N: measured control ratio (%) in dilute emulsion prepared by using compound B alone E: theoretical control ratio (%) in dilute emulsion prepared by using compound A and compound B together A control ratio of 0% means that disease spots of the same level as those of the non-treatment plot were observed, and a control ratio of 100% means that no disease spot was observed.

The results are set forth in Tables 1 to 3.

TABLE 1

| Cucumber gray mold control | | Compound A | | |
|---|---|---|---|---|
| ratio | | 0.1 ppm | 0.025 ppm | 0 ppm |
| Compound B | 400 ppm | 98 (89) | 60 (24) | 0 |
| | 0 ppm | 89 | 24 | 0 |

Each value in the upper row indicates a control ratio of a mixed drug.

Each value in parentheses indicates a Colby's theoretical value.

TABLE 2

| Cucumber gray mold control | | Compound A | | |
|---|---|---|---|---|
| ratio | | 0.1 ppm | 0.025 ppm | 0 ppm |
| Compound B | 100 ppm | 60 (50) | — | 5 |
| | 25 ppm | 59 (48) | 43 (17) | 0 |
| | 6.3 ppm | — | 31 (17) | 0 |
| | 0 ppm | 48 | 17 | 0 |

Each value in the upper row indicates a control ratio of a mixed drug.

Each value in parentheses indicates a Colby's theoretical value.

TABLE 3

| Cucumber gray mold control | | Compound A | | |
|---|---|---|---|---|
| ratio | | 0.1 ppm | 0.025 ppm | 0 ppm |
| Compound B | 1.6 ppm | 84 (53) | 52 (5) | 0 |
| | 0.4 ppm | 71 (53) | 39 (5) | 0 |
| | 0.1 ppm | — | 27 (5) | 0 |
| | 0 ppm | 53 | 5 | 0 |

Each value in the upper row indicates a control ratio of a mixed drug.

Each value in parentheses indicates a Colby's theoretical value.

Example 2 and Comparative Example 2

As the compound A, 2-{2-[(7,8-difluoro-2-methylquinolin-3-yl)oxy]-6-fluorophenyl}propan-2-ol of formula (a-1) was provided. As the compounds B, metconazole, pyraclostrobin, mepanipyrim, pyrimethanil, dithianon, streptomycin, chinomethionat, propineb, propiconazole and oxytetracycline were provided. Dilute emulsions having concentrations shown in Tables 4 and 5 were each subjected to a cucumber gray mold control test.

(Cucumber Gray Mold Control Test)

The test was carried out in the same manner as in Example 1. The results are set forth in Table 4 and Table 5.

TABLE 4

| Cucumber gray mold control ratio | | | Compound A 0.1 ppm | Compound A 0.025 ppm | Compound A 0.0063 ppm | Compound A 0 ppm |
|---|---|---|---|---|---|---|
| Compound B | Metconazole | 1.6 ppm | — | 80 (34) | 76 (36) | 29 |
| | | 0.4 ppm | — | 71 (27) | 66 (30) | 22 |
| | Pyraclostrobin | 6.3 ppm | — | 79 (50) | 73 (52) | 46 |
| | | 1.6 ppm | — | 69 (28) | 65 (31) | 23 |
| | Mepanipyrim | 1.6 ppm | — | 67 (34) | 65 (36) | 29 |
| | | 0.4 ppm | — | 67 (25) | 61 (27) | 19 |
| | Pyrimethanil | 1.6 ppm | — | 64 (22) | 70 (24) | 16 |
| | | 0.4 ppm | — | 58 (13) | 59 (15) | 6 |
| | Dithianon | 100 ppm | — | 77 (16) | 74 (19) | 10 |
| | | 25 ppm | — | 68 (19) | 63 (22) | 13 |
| | Streptomycin | 400 ppm | 72 (36) | 53 (19) | — | 13 |
| | | 100 ppm | 67 (35) | 65 (18) | — | 12 |
| | | 0 ppm | 26 | 7 | 10 | 0 |

Each value in the upper row indicates a control ratio of a mixed drug.
Each value in parentheses indicates a Colby's theoretical value.

TABLE 5

| Cucumber gray mold control ratio | | | Compound A 0.1 ppm | Compound A 0.025 ppm | Compound A 0.0063 ppm | Compound A 0 ppm |
|---|---|---|---|---|---|---|
| Compound B | Chinomethionat | 400 ppm | — | 49 (29) | 30 (17) | 14 |
| | | 100 ppm | — | 38 (34) | 36 (22) | 20 |
| | Propineb | 400 ppm | — | 45 (44) | 47 (35) | 33 |
| | | 100 ppm | — | 41 (39) | 32 (29) | 27 |
| | Propiconazole | 6.3 ppm | 84 (79) | 69 (52) | 65 (44) | 42 |
| | | 1.6 ppm | 80 (73) | 50 (39) | — | 26 |
| | Oxytetracycline | 400 ppm | 77 (72) | 73 (34) | — | 21 |
| | | 100 ppm | 82 (70) | 45 (32) | — | 18 |
| | | 0 ppm | 64 | 17 | 3 | 0 |

Each value in the upper row indicates a control ratio of a mixed drug.
Each value in parentheses indicates a Colby's theoretical value.

As shown in the above tables, the values of the measured control ratios in the case of using the fungicide compositions according to the present invention are higher than the theoretical control ratios calculated in accordance with the Colby's equation. The fungicide compositions according to the present invention each exert a synergistic fungicidal effect.

INDUSTRIAL APPLICABILITY

The agricultural and horticultural fungicide composition of the present invention exhibits an excellent control effect on plant diseases even in an extremely small dose and causes no fear of phytotoxicity to useful plants. Moreover, the agricultural and horticultural fungicide composition of the present invention exerts a prominent synergistic plant disease control effect that is unexpectable from the plant disease control effect obtained by the use of the compound A only or the use of the compound B only. Accordingly, the present invention is industrially useful.

The invention claimed is:

1. An agricultural and horticultural fungicide composition comprising at least one compound A selected from the group consisting of a compound of formula (1) and salts thereof, and at least one compound B selected from the group consisting of silthiofam, an antibiotic, propineb and chinomethionat,

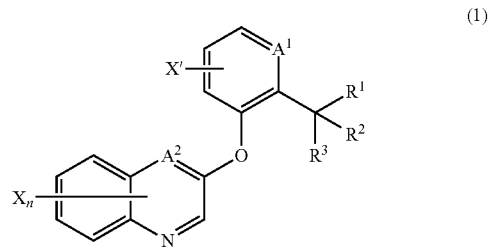

(1)

wherein each X independently is a halogeno group or a C1-6 alkyl group; n is the number of X and is any integer of 0 to 5; X' is a halogeno group; $R^1$, $R^2$ and $R^3$ each independently are a C1-6 alkyl group, a C1-6 alkoxy group or a hydroxy group; and $A^1$ and $A^2$ are a carbon atom, wherein the antibiotic is at least one compound selected from the group consisting of streptomycin, a sulfate thereof, oxytetracycline, kasugamycin and polyoxin complex.

2. The agricultural and horticultural fungicide composition according to claim 1, wherein the compound A is a compound of formula (a-1):

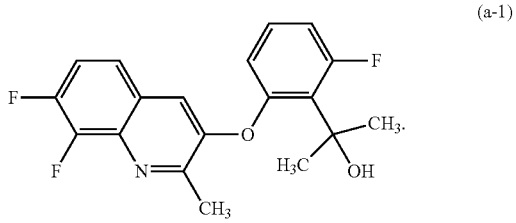

(a-1)

* * * * *

UNITED STATES PATENT AND TRADEMARK OFFICE
CERTIFICATE OF CORRECTION

PATENT NO. : 11,553,716 B2
APPLICATION NO. : 16/963563
DATED : January 17, 2023
INVENTOR(S) : Shinya Watanabe It is certified that error appears in the above-identified patent and that said Letters Patent is hereby corrected as shown below:

In the Claims

Column 20, Claim 1, Line 38, "X is a halogeno group" should be --X' is a halogeno group--

Signed and Sealed this
Eighth Day of August, 2023

Katherine Kelly Vidal
*Director of the United States Patent and Trademark Office*